Patented Nov. 14, 1939

2,180,082

UNITED STATES PATENT OFFICE 2,180,082

POLYMERIZATION PRODUCTS FROM BUTADIENE OR ITS SUBSTITUTION PRODUCTS AND SOLID POLYMERIZED ISOBUTYLENE

Martin Mueller-Cunradi and Walter Daniel, Ludwigshafen-on-the-Rhine, Germany, assignors to I. G. Farbenindustrie Aktiengesellschaft, Frankfort-on-the-Main, Germany No Drawing. Application January 7, 1938, Serial No. 183,796. In Germany January 22, 1937

5 Claims. (Cl. 260—42)

The present invention relates to rubber-like polymerization products and an improved process of producing same.

It is already known that rubber-like interpolymerization products can be obtained from mixtures of butadiene with other polymerizable compounds. In the polymerization of a mixture of butadiene and isobutylene, however, no polymerization takes place or there are obtained only non-uniform products, although when the single components are polymerized alone, for example butadiene by means of sodium or in emulsion and isobutylene by means of boron fluoride at very low temperatures, rubber-like products are formed.

We have now found that valuable rubber-like polymerization products are obtained by polymerizing butadiene or its substitution products, such as isoprene, dimethylbutadiene, phenylbutadiene or chlorbutadienes, in the presence of solid highly polymerized isobutylene by known methods, as for example with sodium, by simple heating or in aqueous emulsion in the presence of peroxides. For the said purpose, the polymerized isobutylene may be dissolved in the monomeric butadiene or the said substitution products, inert solvents being added if desired, the solution then being subjected to polymerization. The relative proportions of the single components may be varied within wide limits.

The resulting rubber-like polymerization products have for example at about the same extensibility and rebound-elasticity a considerably higher tensile strength, greater elasticity and are therefore more readily capable of being worked up than the corresponding polymerization products from butadiene or its substitution products alone. They also differ from ordinary mixtures of polymerized isobutylene and polymerized butadiene or its substitution products the mechanical properties of which are even inferior to those of polymerization products of butadiene alone.

The presence of polymerized isobutylene in the monomeric butadiene does not impair the polymerization and does not even appreciably retard the same, while even quite small additions of other substances strongly retard the polymerization of butadiene or even entirely prevent it.

The following examples will further illustrate how this invention may be carried out in practice but the invention is not restricted to these examples. The parts are by weight.

*Example 1*

10 parts of polymerized isobutylene having a molecular weight of 50,000 are dissolved in 68 parts of butadiene and 10 parts of cyclohexane in a pressure-tight vessel. 1.6 parts of sodium are then added. After heating for two days at about 40° C., washing and drying on the rollers, a polymerization product containing about 12.8 per cent of polymerized isobutylene is obtained in practically the quantitative yield.

If this be vulcanized in a mixture containing, for each 100 parts of polymerization product, 50 parts of active gas carbon, 5 parts of zinc oxide, 5 parts of softener, as for example stearic acid, 1 part of sulphur, 2 parts of a vulcanization accelerator and 2.1 parts of an agent protecting against ageing, at 133° C., a product is obtained having a tensile strength of 198 kilograms per square centimeter with an extension of 623 per cent while a polymerization product prepared under the same conditions from butadiene alone has a tensile strength of 200 kilograms per square centimeter with an extension of 524 per cent, i. e. a considerably lower extension at practically the same tensile strength.

*Example 2*

10 parts of polymerized isobutylene having a molecular weight of 100,000 together with 60 parts of butadiene and 20 parts of cyclohexane are subjected to polymerization in the manner described in Example 1. The interpolymerization product obtained contains 14.3 per cent of polymerized isobutylene.

After vulcanizing a mixture composed as in Example 1 at 133° C. for 100 minutes, the interpolymerization product acquires a tensile strength of 194 kilograms per square centimeter and an extension of 588 per cent, while the polymerization product prepared in a corresponding manner from butadiene alone has a tensile strength of 191 kilograms per square centimeter and an extension of 454 per cent. If 60 parts of the said butadiene polymerization product be mixed on the rollers with 10 parts of polymerized isobutylene having a molecular weight of 100,000 and the mixture be vulcanized with the vulcanization additions specified above for 100 minutes at 133° C., a vulcanization product is obtained having a tensile strength of only 143 kilograms per square centimeter and an extension of 364 per cent.

*Example 3*

30 parts of polymerized isobutylene having a molecular weight of 50,000 are dissolved in 60 parts of beta-chlorbutadiene containing about 0.5 per cent of hydroquinone. The solution is heated at 40° C. for 2 days with 5 parts of benzoyl peroxide. After rolling out, there is obtained in a yield of about 98 per cent a soft foil which absorbs fillers, in particular carbon black, much more rapidly than a pure beta-chlorbutadiene polymerization product and which does not harden after storage for long periods.

What we claim is:

1. A process of producing rubber-like polymerization products which comprises polymerizing a member of the group consisting of butadiene and its substitution products in the presence of solid highly polymerized isobutylene.

2. A process of producing rubber-like polymerization products which comprises polymerizing butadiene in the presence of solid highly polymerized isobutylene.

3. A process of producing rubber-like polymerization products which comprises polymerizing beta-chlorbutadiene in the presence of solid highly polymerized isobutylene.

4. Rubber-like polymerization products obtained by polymerizing a member of the group consisting of butadiene and its substitution products in the presence of solid highly polymerized isobutylene.

5. Rubber-like polymerization products obtained by polymerizing butadiene in the presence of solid highly polymerized isobutylene in aqueous emulsion.

MARTIN MUELLER-CUNRADI.
WALTER DANIEL.